(12) United States Patent
Hulse

(10) Patent No.: US 12,400,060 B2
(45) Date of Patent: Aug. 26, 2025

(54) ANALOGUE CIRCUIT DESIGN

(71) Applicant: Agile Analog Ltd, Cambridgeshire (GB)

(72) Inventor: Michael Hulse, Cambridgeshire (GB)

(73) Assignee: Agile Analog Ltd (GB)

( * ) Notice: Subject to any disclaimer, the term of this patent is extended or adjusted under 35 U.S.C. 154(b) by 579 days.

(21) Appl. No.: 17/910,616

(22) PCT Filed: Feb. 22, 2021

(86) PCT No.: PCT/GB2021/050436
§ 371 (c)(1),
(2) Date: Sep. 9, 2022

(87) PCT Pub. No.: WO2021/181062
PCT Pub. Date: Sep. 16, 2021

(65) Prior Publication Data
US 2023/0111448 A1    Apr. 13, 2023

(30) Foreign Application Priority Data
Mar. 11, 2020   (GB) ...................................... 2003537

(51) Int. Cl.
*G06F 30/30* (2020.01)
*G06F 30/367* (2020.01)

(52) U.S. Cl.
CPC .................................. *G06F 30/367* (2020.01)

(58) Field of Classification Search
CPC ........ G06F 30/367; G06F 30/39; G06F 30/36; G06F 2111/02
See application file for complete search history.

(56) References Cited

U.S. PATENT DOCUMENTS

| 8,112,264 B1 | 2/2012 | Ho |
| 8,131,521 B1 | 3/2012 | Karanko et al. |

(Continued)

FOREIGN PATENT DOCUMENTS

| JP | S63-263570 A | 10/1988 |
| JP | S63-286960 A | 11/1988 |

(Continued)

OTHER PUBLICATIONS

Official Action and Search Report for Taiwanese application No. 110108269, mailed Feb. 24, 2025, 4 pages.

(Continued)

*Primary Examiner* — Jack Chiang
*Assistant Examiner* — Brandon Bowers
(74) *Attorney, Agent, or Firm* — Barnes & Thornburg

(57) ABSTRACT

An analogue circuit design apparatus is disclosed comprising a primary design unit and a plurality of secondary design units. The primary design unit is configured to: identify a plurality of circuit portions for forming the analogue circuit; determine for each circuit portion respective technical criteria; and provide the respective technical criteria to at least one of a plurality of secondary design units. Each of the plurality of secondary design units is configured to: design a respective circuit portion based on the technical criteria for that respective circuit portion; and output a resulting initial design of the respective circuit portion. The primary design unit is further configured to obtain, a set of designs comprising a respective design for each circuit portion, generate, at least an initial design for the analogue circuit, based on the set of designs, simulate an analogue circuit based on the generated design and verify whether or not the analogue circuit meets the technical requirements for the analogue circuit.

20 Claims, 9 Drawing Sheets

(56) References Cited

U.S. PATENT DOCUMENTS

| | | | |
|---|---|---|---|
| 2005/0114821 A1 | 5/2005 | Petunin et al. | |
| 2006/0200266 A1 | 9/2006 | Fotakis et al. | |
| 2011/0054875 A1* | 3/2011 | Chang | G06F 30/367 |
| | | | 703/14 |
| 2013/0311152 A1* | 11/2013 | Walker | G06F 30/367 |
| | | | 703/4 |
| 2019/0187207 A1* | 6/2019 | Pillay | G06F 30/33 |

FOREIGN PATENT DOCUMENTS

| | | |
|---|---|---|
| JP | H01-214977 A | 8/1989 |
| JP | 2002-223165 A | 8/2002 |
| TW | 201322031 A | 6/2013 |
| TW | 201520802 A | 6/2015 |
| WO | 2006/013675 A1 | 2/2006 |

OTHER PUBLICATIONS

Notice of Reasons for Refusal in Japanese Patent Application No. 2022-552330, dated Oct. 22, 2024, 6 pages.
Written Opinion for Application No. PCT/GB2021/050436, 4 pages.
Search Report for Application No. GB2003537.4 dated Nov. 27, 2020, 1 page.

* cited by examiner

ANALOGUE CIRCUIT DESIGN

FIELD OF THE INVENTION

The present disclosure relates to methods and systems for analogue circuit design, and in particular, methods and systems for automating the design process for analogue circuits.

BACKGROUND

Analogue components cause the most chip production test failures and up to 95% of field failures. While circuit design for digital circuits has become automated to some degree in recent times, the automation of analogue circuit design has proven problematic, not least due to e.g. parasitic effects. Conventional approaches to analogue circuit design might involve "best guess" estimates or specification guard-banding performed manually by engineering teams relying on prior knowledge and experience, often with the result that circuits are over-engineered and inefficient, or prone to failure. There is therefore a desire to create a more efficient and reliable process for designing analogue circuits.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect there is provided an analogue circuit design apparatus. The apparatus comprises:
  a primary design unit and a plurality of secondary design units;
  wherein the primary design unit is configured to:
    a) obtain information representing technical requirements for the analogue circuit;
    b) identify, based on the received information, a plurality of circuit portions for forming the analogue circuit;
    c) determine, for each circuit portion of the plurality circuit portions, respective technical criteria for that circuit portion; and
    d) provide the respective technical criteria for each circuit portion to at least one of a plurality of secondary design units;
  each of the plurality of secondary design units of the analogue circuit design apparatus is configured to:
    e) design, a respective circuit portion of the plurality of circuit portions based on the technical criteria for that respective circuit portion provided by the primary design unit; and
    f) output a resulting design of the respective circuit portion; and the primary design unit is further configured to:
    g) obtain, a set of designs comprising a respective design for each circuit portion from at least one of a plurality of secondary design units;
    h) generate, at least an initial design for the analogue circuit, based on the set of designs;
    i) simulate an analogue circuit based on the generated design to produce at least one simulation output;
    j) verify whether or not the analogue circuit meets the technical requirements for the analogue circuit, and when the analogue circuit meets the technical requirements, output the generated design; and
    when the analogue circuit does not meet the technical requirements:
      determine, for at least one affected circuit portion of the plurality circuit portions, revised technical criteria for that affected circuit portion based on the simulation output and the technical requirements;
      provide, to at least one corresponding secondary design unit, the revised technical criteria for each affected circuit portion;
      receive a respective updated design of each affected circuit portion from the at least one corresponding secondary design unit;
      update the set of designs with the respective updated design of each affected circuit portion; and
      repeat steps h) to j) for the updated set of designs.

It will be understood that the revised technical criteria for an affected circuit portion may dictate and/or require that the structure of that circuit portion changes. For example, the revised technical criteria may mean that additional or fewer components (e.g. an additional gain stage) of that circuit portion are needed. In some examples the revised technical criteria may even mean that entire portions of the circuit are no longer needed and therefore the corresponding design units no longer needed. In some examples the revised technical criteria may additionally or alternatively mean that design units of another design layer are needed to design respective sub-portions of the design, for example the revised technical criteria may necessitate the use of tertiary design units to design sub-portions of the corresponding portion of the circuit.

Each of the plurality of secondary design units of the analogue circuit design apparatus may be configured to simulate the behaviour of the respective circuit portion and verify whether or not the respective circuit portion meets the technical criteria for that respective circuit portion; and
  when the respective circuit portion meets the technical criteria, output the designed respective portion; and
  when the respective circuit portion does not meet the technical criteria, adapt the design of the respective portion based on the simulated behaviour.

Each of the plurality of secondary design units may be configured to adapt the design of the respective portion based on the simulated behaviour by adapting the design of the respective portion based on a difference between the simulated behaviour and the technical criteria.

In some examples adapting the design of the respective portion based on the simulated behaviour comprises adapting the technical criteria of the corresponding respective circuit portion.

Each of the plurality of secondary design units of the analogue circuit design apparatus may be configured to simulate the behaviour of the respective circuit portion and output the simulated behaviour as context information for use by another one of the secondary design units for designing a corresponding further respective circuit portion.

In some examples, after at least an initial design of a given circuit portion has been completed by at least another one of the secondary design units, at least one of the secondary design units is configured to adapt its output initial design based on a context of its corresponding circuit portion, the context comprising technical criteria generated based on the completed design of the given circuit portion completed by the at least another one of the secondary design units.

Each of the secondary design units may be configured to repeat the step of adapting the design of a further circuit portion in the event that the modification of the design of another circuit portion of the plurality of circuit portions causes a change of context for that further circuit portion. Additionally or alternatively, each of the secondary design units may be configured to repeat the step of adapting the design of a further circuit portion only in the event that the change in context is greater than a selected threshold level of change in context. Additionally or alternatively, each of the secondary design units is configured to adapt the design of the circuit portions output from each of the plurality of secondary design units based on their respective contexts after at least an initial design of their corresponding circuit portion has been completed by each corresponding secondary design unit. In some examples the context of the further circuit portion is obtained by simulating the performance of the given circuit portion In some examples each secondary design unit is configured to design a respective circuit portion of the plurality of circuit portions based on the technical criteria for that respective circuit portion provided by the primary design unit comprises performing a lookup in a database of designed circuits and/or circuit portions for circuit portions that fulfill the technical criteria. Additionally or alternatively, each of the plurality of design units is configured to design a respective circuit portion of the plurality of circuit portions by budgeting e.g. based on highest and/or lowest specification or values relevant to the technical criteria, and/or by referencing a calculated value or a value determined from previous iterations.

It will be understood that the portions of the circuit may be selected based on the functionality provided by those portions of the circuit.

In some examples each secondary design unit is configured to adapt the design of a selected portion of the circuit based on the context of that portion comprises adjusting the technical criteria for the selected portion of the circuit.

It will be understood that adapting the design of a portion of a circuit based on context information may comprise adjusting the inputs and outputs that components/portions of the circuit are configured to handle and process, and/or may comprise adapting the structure of the design, for example to alter the type, size and/or number of components that may form part of that portion of the design.

In another aspect there is provided a method of designing an analogue circuit, the method comprising:

at a primary design unit of an analogue circuit design apparatus:
 a) obtaining information representing technical requirements for the analogue circuit;
 b) identifying, based on the received information, a plurality of circuit portions for forming the analogue circuit;
 c) determining for each circuit portion of the plurality circuit portions respective technical criteria for that circuit portion; and
 d) providing the respective technical criteria for each circuit portion to at least one of a plurality of secondary design units;

at each of the plurality of secondary design units of the analogue circuit design apparatus:
 e) designing, a respective circuit portion of the plurality of circuit portions based on the technical criteria for that respective circuit portion provided by the primary design unit; and
 f) outputting, a resulting design of the respective circuit portion; and at the primary design unit:
 g) obtaining, a set of designs comprising a respective design for each circuit portion from at least one of a plurality of secondary design units;
 h) generating, at least an initial design for the analogue circuit, based on the set of designs;
 i) simulating an analogue circuit based on the generated design to produce at least one simulation output;
 j) verifying whether or not the analogue circuit meets the technical requirements for the analogue circuit, and
  when the analogue circuit meets the technical requirements, outputting the generated design; and
  when the analogue circuit does not meet the technical requirements:
   determining, for at least one affected circuit portion of the plurality circuit portions, revised technical criteria for that affected circuit portion based on the simulation output and the technical requirements;
   providing, to at least one corresponding secondary design unit, the revised technical criteria for each affected circuit portion;
   receiving a respective updated design of each affected circuit portion from the at least one corresponding secondary design unit;
   updating the set of designs with the respective updated design of each affected circuit portion; and
   repeating steps h) to j) for the updated set of designs.

In some examples the method comprises at each of the plurality of secondary design units of the analogue circuit design apparatus, simulating the behaviour of the respective circuit portion and verifying whether or not the respective circuit portion meets the technical criteria for that respective circuit portion; and
 when the respective circuit portion meets the technical criteria, outputting the designed respective portion; and
 when the respective circuit portion does not meet the technical criteria, adapting the design of the respective portion based on the simulated behaviour.

Adapting the design of the respective portion based on the simulated behaviour may comprise adapting the design of the respective portion based on a difference between the simulated behaviour and the technical criteria. Adapting the design of the respective portion may be based on the simulated behaviour comprises adapting the technical criteria of the corresponding respective circuit portion. Additionally or alternatively the method comprises, at each of the plurality of secondary design units of the analogue circuit design apparatus, simulating the behaviour of the respective circuit portion and outputting the simulated behaviour as context information for use by another one of the secondary design units for designing a corresponding further respective circuit portion. In some examples, after at least an initial design of a given circuit portion has been completed by at least another one of the secondary design units, at least one of the secondary design units is configured to adapt its output initial design based on a context of its corresponding circuit portion, the context comprising technical criteria generated based on the completed design of the given circuit portion completed by the at least another one of the secondary design units. This may further comprise repeating the step of adapting the design of a further circuit portion in the event that the modification of the design of another circuit portion of the plurality of circuit portions causes a change of context for that further circuit portion. Repeating the step of adapting the design of a further circuit portion may occur only in the event that the change in context is greater than a selected threshold level of change in context. Additionally or alternatively repeating the step of adapting may comprise guard banding, budgeting or performing calculations e.g. based on highest and/or lowest specification or values relevant to the technical criteria, and/or by referencing a calculated value or a value determined from previous iterations.

In some examples each of the plurality of design units is optionally configured to design a respective circuit portion of the plurality of circuit portions by budgeting e.g. based on highest and/or lowest specification or values relevant to the technical criteria, and/or by referencing a calculated value or a value determined from previous iterations.

The method may further comprise adapting the design of the circuit portions output from each of the plurality of secondary design units based on their respective contexts after at least an initial design of their corresponding circuit portion has been completed by each corresponding secondary design unit.

In some examples the context of the further circuit portion is obtained by simulating the performance of the given circuit portion In some examples designing a respective circuit portion of the plurality of circuit portions based on the technical criteria for that respective circuit portion provided by the primary design unit comprises performing a lookup in a database of designed circuits and/or circuit portions for circuit portions that fulfill the technical criteria.

It will be understood that the portions of the circuit may be selected based on the functionality provided by those portions of the circuit.

It will also be understood that adapting the design of a selected portion of the circuit based on the context of that portion may comprise adjusting the technical criteria for the selected portion of the circuit.

It will also be understood that the method may further comprise fabricating an analogue circuit to the output design.

The context may comprise information relating to the parameters and variables that a corresponding portion of the circuit will experience when applied in use with at least some of the other portions of the circuit. For example, the context may comprise any one or combination of: silicon process, temperature range, output load, output impedance, input capacitance, input common mode range, input differential swing, supply voltage, types of transistors available, output common mode range, output swing, settling time, noise tolerance; power supply rejection ratio (PSRR); common mode range—input (Input CMR); common mode range—output (Output CMR); linearity; maximum offset; bandwidth; minimum slew rate; intrinsic delay; minimum phase margin; active power consumption; static power consumption; IP3 point; filter centre-frequency; filter band-pass range; load step response; line step response; output accuracy; noise figure; calibration range; noise floor; SNR; ENOB; SINAD; output frequency range; jitter—ptp; jitter—RMS; output ripple ptp; total harmonic distortion; start-up time; channel isolation; reference voltage; gain error; offset error; gain drift.

In another aspect there is provided a computer readable non-transitory storage medium comprising a program for a computer configured to cause a processor to perform any of the methods described above.

DRAWINGS

Embodiments of the disclosure will now be described, by way of example only, with reference to the accompanying drawings, in which.

SPECIFIC DESCRIPTION

Figure 1B:
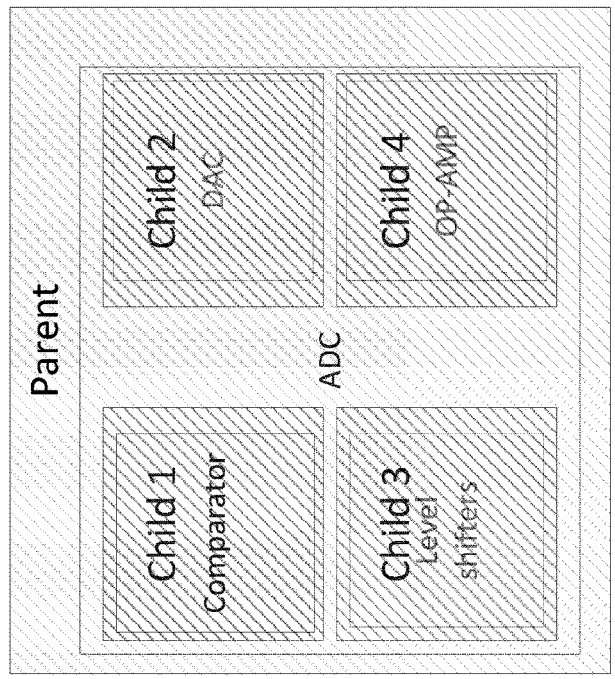
FIG. 1B shows the functional schematic diagram of FIG. 1A divided into conceptual blocks.
Figure 1A:
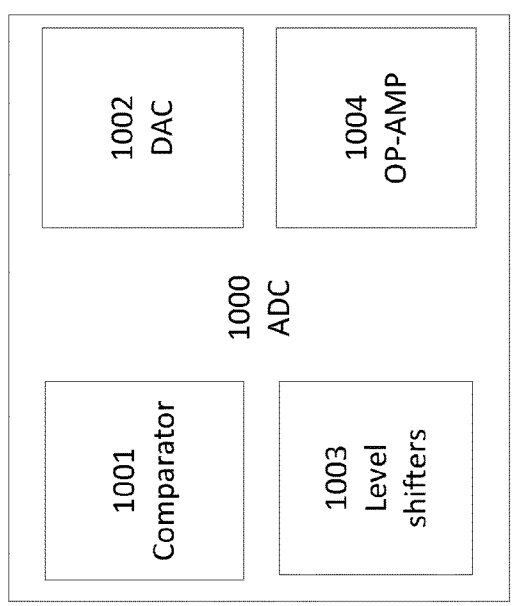
FIG. 1A shows a functional schematic diagram of an example analogue circuit.

FIG. 1A shows a simplified functional schematic of an example analogue electronic circuit, which in this example is an analogue-to-digital converter (ADC) 1000. The analogue circuit may comprise a number of portions or components, such as a comparator 1001, a DAC 1002, level shifters 1003 and an OP-AMP 1004. While each portion or component may initially be considered in isolation, the context or environment in which that portion or component operates when applied in the circuit as a whole in situ may affect how that component/block operates, and even whether that portion or component is suitable for use in that circuit or not. As such, this context affects the design of the analogue circuit and is part of the reason why designing analogue circuits has to date proved difficult to automate. Moreover, the design of analogue circuits has proved difficult to automate due to the complex feedback loops and mathematical relationships involved between different portions/components of the analogue circuit.

Figure 2:
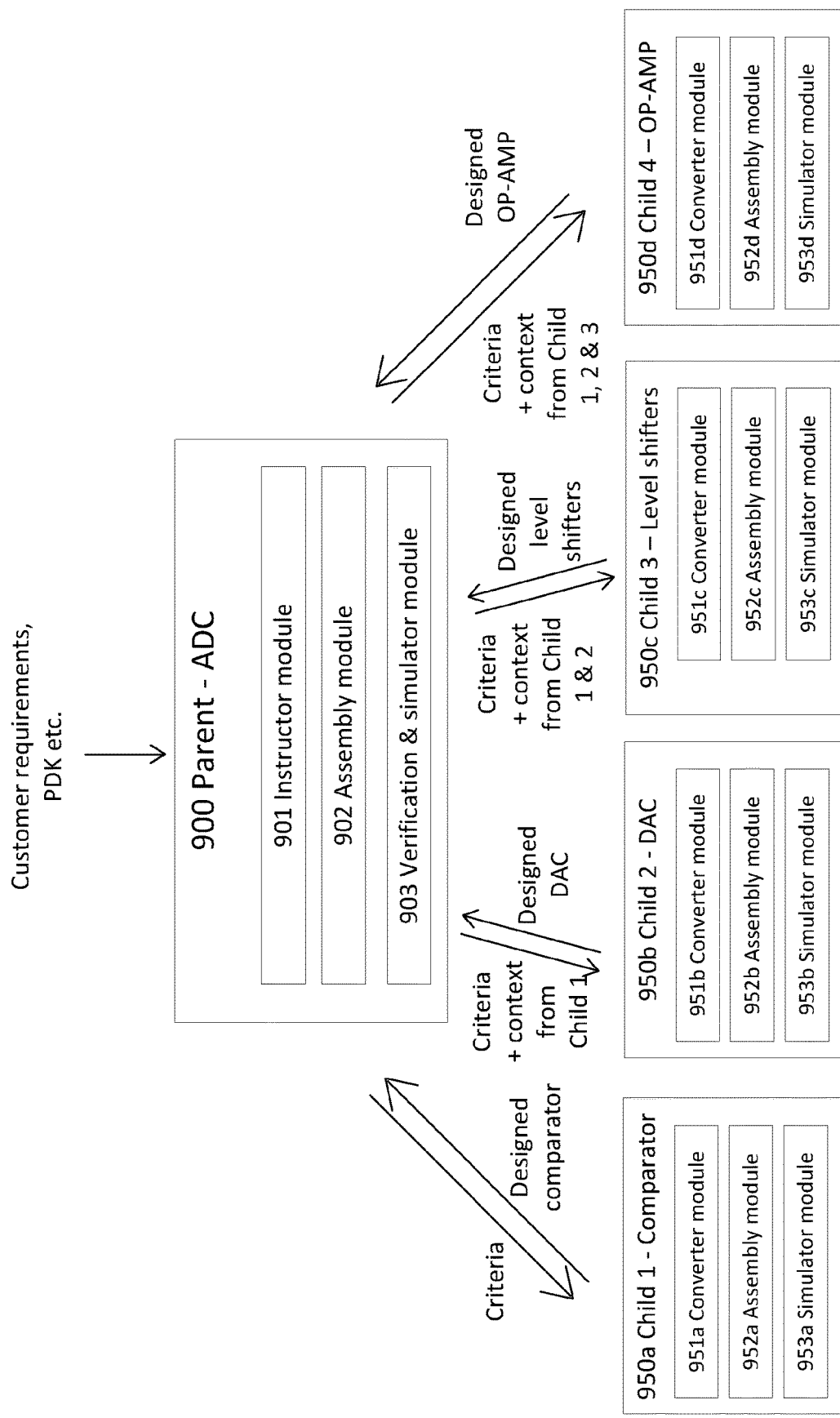
FIG. 2 shows a functional schematic diagram of a computer-implemented hierarchical model for designing analogue circuits.

Embodiments of the claims relate to a method and system for automating the design of analogue circuits that takes into account the context of other portions or components of the circuit to design a more efficient circuit. The inventors in the present case have done that by developing a computer-implemented model that delegates responsibility for designing portions or components of the analogue circuit to respective units or "blocks". An example of this model is shown in FIG. 2. Such a hierarchical model involves the use of a primary design unit, called a "parent block" 900, that acts as a controlling entity, and a number of secondary design units, called "child blocks" 950a-d that receive instructions from the primary design unit or parent block as to what they need to design. Each secondary design unit or child block 950a-d is configured to design a respective component or portion of the analogue circuit based on the instructions received from the parent 900. The instructions include not only the technical requirements (the "criteria") that the component or portion needs to meet (for example functional requirements) but also information relating to the context of that component or portion of the circuit—in other words, what that portion or component of the circuit will experience when placed in the completed circuit in situ.

The computer-implemented hierarchical model is iterative. Once the parent block 900 has instructed each child block 950a-d to design their respective portions or components, it is likely that a degree of redesign of the circuit and its portions or components is required to take into account the portions or components designed by the other child blocks 950a-d, and thus the context in which each portion or component operates. Therefore, once an initial design of a circuit portion or component has been designed by one of the child blocks 950a-d, the design of another circuit portion or component by another child block 950a-d may need to be adapted based on a context provided by that initial design. This process may be repeated to take into account any further adaptations in design that are performed—for example once the design of the other circuit portion or component has been performed, the context of the circuit portion or component designed by the first child block may have changed (based on the design of the other circuit portion) and thus the design of the circuit portion or component designed by the first child block may need to be adapted, and so on. The process of adapting designs of circuit portions or components based on their context may be repeated iteratively by the child blocks 950a-d, for example until the context caused by any adjustments to any other portions or components of the analogue circuit have been taken into account. For example, the process may iteratively repeat until any changes in context are less than a selected threshold level of change in context.

As noted above, the context comprises technical criteria generated based on the design, and may comprise parameters and variables that the portion or component of the circuit experiences in use. The context of any given circuit portion or component may be generated based on simulating the performance of a circuit portion(s) or component(s) that interact with that given circuit portion or component, or even by simulating a completed circuit comprising that given circuit portion or component. For example, the parent block 900 may be configured to assemble a completed circuit from the portions or components designed by each child block 950a-d and simulate the assembled circuit's operation. The context of any given circuit portion or component may additionally or alternatively be generated based on mathematical calculations or extraction.

The present inventors have found that advantageously such an iterative hierarchical model allows the design of analogue circuits to be automated. As a result, advantageously this means that over-engineered analogue circuits can be avoided, and instead more efficient circuits designed and created.

As noted above, FIG. 1A shows an example analogue circuit 1000 which in this example is an Analogue-to-Digital Converter (ADC). Conceptually the circuit can be divided up into functional blocks corresponding to different portions or components of the circuit, for example based on their respective functionality. For example, an ADC may comprise a comparator 1001, a Digital-to-Analogue Converter (DAC) 1002, a plurality of level shifters 1003 and one or more OP-AMPs 1004. In the example shown in FIG. 1A the circuit can be divided up conceptually into blocks corresponding to these different portions or components. For example, as shown in FIG. 1B the comparator may be divided up conceptually into a first "child block" 950a, the DAC into a second child block 950b, the level shifters into a third child block 950c, and the OP-AMP into a fourth child block 950d. The ADC as a whole may be conceptually classified as its own block (labeled "Parent" 900 in FIG. 1B). It will be understood that the ADC may itself form a conceptual block within a larger analogue circuit.

As noted above, in use in situ, there is an interplay between each of the different blocks of an analogue circuit. The interactions between these blocks in situ, and consequently the parameters and variables that each block experiences when placed in that circuit, affect the performance of that circuit. For example, the specification of the OP-AMP used in the circuit may depend on a number of parameters and variables arising from the selection and design of the comparator, the DAC and/or the level shifters, and the connections between them.

The design and selection of the portions or components that makes up that block should therefore be performed in a manner that takes into account these interactions, such that the block as a whole is capable of handling these parameters and variables that the components are subjected to as a result of the interactions.

A non-exhaustive list of examples of the parameters and variables that may affect the selection and design of these different blocks may include: silicon process, temperature range, output load, output impedance, input capacitance, input common mode range, input differential swing, supply voltage, types of transistors available, output common mode range, output swing, settling time, noise tolerance; power supply rejection ratio (PSRR); common mode range—input (Input CMR); common mode range—output (Output CMR); linearity; maximum offset; bandwidth; minimum slew rate; intrinsic delay; minimum phase margin; active power consumption; static power consumption; IP3 point; filter centre-frequency; filter band-pass range; load step response; line step response; output accuracy; noise figure; calibration range; noise floor; SNR; ENOB; SINAD; output frequency range; jitter—ptp; jitter—RMS; output ripple ptp; total harmonic distortion; start-up time; channel isolation; reference voltage; gain error; offset error; gain drift.

These parameters and variables may be called the "context" or environment in which the block is in. To create an optimal analogue circuit, knowledge of this context can improve the design of the circuit. However, it will of course be appreciated that the design of an analogue circuit is an iterative process, whereby the selection and adjustment of one block may affect the context of another block, and so on. Thus once the components of one block have been selected/adjusted, the components of another block may need to be adjusted or re-selected to take into account the new context in which that block is in. Such an iterative process is not practical to perform manually, is error-prone and can only be detected through communication.

As noted above, an example computer-implemented model for use in a method of automating the design of analogue circuits is shown in FIG. 2. FIG. 2 shows schematically the blocks shown in FIG. 1B and discussed above, and the interactions between the blocks.

In the example shown in FIG. 2, each block of the model is responsible for designing the components/functionality indicated by that block. In FIG. 2, child 1 950*a* is responsible for designing the comparator 1001, child 2 950*b* is responsible for designing the DAC 1002, child 3 950*c* is responsible for designing the level shifters 1003, and child 4 950*d* is responsible for designing the OP-AMP 1004. The parent block 900 is responsible for designing as a whole the ADC 1000, and delegates responsibility for designing the portions/components/functionality of the ADC to the child blocks 950*a-d*. In some examples the parent block 900 may select how many child blocks 950*a-d* are required, and the responsibility ascribed to each block. Although the child blocks 950*a-d* are shown in an order, it will be understood that this order is not necessarily representative of the order in which the portions of the circuit are designed. For example, the parent block 900 may instruct the child block 950*d* responsible for the OP-AMP to design that portion of the circuit first. In some examples the child blocks 950*a-d* may be configured to design the output first, and work backwards from there.

While each portion or component of a block may initially be selected in isolation, the context in which that component/block operates when applied in the circuit as a whole in situ may affect how that component/block operates, and even whether that component is suitable for use in that circuit or not. Therefore while the parent block may instruct each child block to design their respective portions or components, once an initial version of the designed circuit is assembled by the parent 900 from the portions or components designed by each child block 950*a-d*, it is likely that a degree of redesign of the circuit 1000 and its portions or components is required to take into account the portions or components selected by the other child blocks 950*a-d*, and thus the context in which each component/block operates. As noted above, this will be an iterative process.

The parent block 900 is therefore configured to act as a controller, processing and handling the design process carried out by each of the child blocks. To perform this function, as shown in FIG. 2, the parent block 900 may comprise a number of different modules each configured to perform different functions as part of the design process. The parent block in FIG. 2 comprises an instructor module 901, an assembly module 902 and a verification and simulator module 903.

The instructor module 901 is configured to receive customer requirements for the circuit to be designed, along with other requirements such as the PDK/conditions/control parameters e.g. dictated by the foundry, and to convert these into a series or set of technical criteria that each child block 950*a-d* needs to meet when designing their respective components of the circuit. It is also configured to prepare and send the instructions to each child block 950*a-d* as to what they need to design and what criteria they need to meet in doing this. The instructions may also include the context of other designed portions of circuits designed by other child blocks and the wider context of the circuit in which that component or portion of the circuit is intended to be operated in. For example, the technical criteria may be adjusted to take into account the context.

The assembly module 902 is configured to receive and collate all of the respective designed portions or components of the analogue circuit provided by each of the child blocks 950*a-d*, and to assembly a complete analogue circuit based on the respective designed portions or components. The completed analogue circuit may then be tested by the verification and simulator module 903.

The verification and simulator module 903 is configured to receive the designed components from each of the child blocks and to compare these to the technical set of requirements to determine whether the designed portions or components are satisfactory or not. This may comprise comparing their performance to the customer requirements, for example by verifying whether or not a designed respective circuit portion or component meets its corresponding technical criteria and/or whether or not the designed analogue circuit meets the customer requirements. It may additionally or alternatively comprise a validation check to determine whether or not the circuit that is designed is valid in the sense that it can operate within certain technical limitations.

The verification module 903 may also comprise a simulator module configured to act as a "test bed" and simulate the functioning of the assembled components of the circuit. Such a simulation may yield the context information. The simulator module may compare the simulated functioning of the circuit to the customer requirements, and optionally verify whether or not a designed circuit portion meets its corresponding technical criteria and/or whether or not the designed analogue circuit meets the customer requirements. In some examples it will be understood that the simulator module may replace the verification module 903.

Each child block 950*a-d* also comprises a number of different modules each configured to perform different functions as part of the design process. In the example shown in FIG. 2 each child block 950*a-d* comprises a converter module 951*a-d*, an assembly module 952*a-d* and a simulator module 953*a-d*. It will be understood that in some examples each child block 950*a-d* may further comprise additional modules for instructing tertiary design units or "grandchild" blocks, similar to the way in which the parent block 900 in FIG. 2 comprises modules such as the instructor module and verification module for instructing and verifying the design process from the child blocks 950*a-d*, as will be described in more detail below with reference to FIGS. 3 to 6.

The converter module 951*a-d* of each child block 950*a-d* is configured to receive the technical criteria received from the parent block 900 and optionally the context of the circuit as a whole, as well as the context of the other components of the circuit, and convert these into a set of requirements for designing a portion or component of the analogue circuit to meet those criteria. It will be understood that in some examples the context information may be provided and received as part of the technical criteria, but in other examples it may be provided in addition to (e.g. separate from) the technical criteria.

The assembly module 952*a-d* is configured to select and/or design electronic components to satisfy the requirements being asked of it that meet the criteria dictated by the parent block and the context of the circuit as a whole and/or the context of the other components of the circuit.

The simulator module 953*a-d* may also be configured to simulate how those components would run in situ to check/verify whether the designed portions or components designed by the assembly module are technically feasible.

In use, the parent block 900 receives a set of requirements for an analogue circuit 1000 to be designed. In the example shown in FIG. 2, the parent block 900 receives a set of requirements for an ADC to be designed that has certain properties including, for example properties dictated by the foundry that will be manufacturing the ADC. The parent block 900 receives these requirements and the instructor module 901 converts these into a set of technical criteria. These technical criteria are then sent to each of the child blocks 950*a-d*.

The instructor module 901 may send these technical criteria to each of the child blocks 950*a-d* in parallel (i.e. all at the same time) or in series (e.g. where the criteria are sent to child 1, then child 2, then child 3 and so on). In some examples the instructor module 901 may wait until it receives a designed circuit from the first child before sending a set of technical criteria to the next child, and in some examples the instructor module may be configured to adjust the technical criteria sent to the next child based on the designed circuit received from the preceding child—in other words based on the context of the designed circuit received from the preceding child.

In examples where the technical criteria are sent to the child blocks 950*a-d* in series, the technical criteria may comprise means to distinguish which portions of the technical criteria are relevant to which child blocks 950*a-d*—for example, the technical criteria may comprise headers or flags that identify whether or not a particular portion of the technical criteria is relevant to a child block 950*a-d* or not. These headers or flags may be determined by the parent block 900, and the technical criteria adjusted accordingly to incorporate them.

Each child block 950*a-d* receives these technical criteria from the parent block 900 and each respective converter module 951*a-d* converts these into a set of requirements for designing a portion or component of the analogue circuit to meet those technical criteria. The assembly module 952*a-d* receives these requirements and designs components/a portion of the circuit that meets these requirements. It will be understood that this design process may comprise a lookup in a database of known circuit designs (or portions therefore) and finding a circuit design that best matches the technical criteria.

The simulator module 953*a-d* then simulates how these components/portion of the circuit would work in situ to check whether the designed components/portion of the circuit designed by the assembly module is technically feasible and/or to verify whether or not the corresponding designed respective circuit portion meets its corresponding technical criteria. If the designed circuit portion meets its corresponding technical criteria, the child block 950*a-d* is then configured to send or output the designed portion or component of the circuit back to the parent 900. If the designed circuit portion does not meet its corresponding technical criteria, the child block 950*a-d* is then configured to adapt the design of its circuit portion and repeat the process.

Once the parent 900 receives all of the designed portions or components of the circuit back from all the child blocks 950*a-d*, the assembly module 902 of the parent 900 then assembles the completed circuit (in this case the ADC) from the portions or components designed by each child block and verifies whether the designed circuit meets the technical requirements via the verification and simulator module 903. It may do this by simulating how the assembled circuit performs and comparing this simulated performance to the customer requirements and/or the technical requirements. It will be understood that in some examples this simulated performance of the completed analogue circuit design may provide the context (e.g. for another design unit), and the parent 900 may adjust the technical criteria based on the context obtained via the simulation of the completed analogue circuit design.

If the simulated performance of the designed circuit does not meet the customer requirements or the technical requirements (for example, a parameter of the simulated circuit is greater than a threshold level of different from a parameter dictated by the technical requirements) then the verification module 903 communicates this to the instructor module 901. The instructor module 901 may then adjust the technical criteria based on the difference between the simulated performance of the circuit and the technical requirements, and send these revised technical criteria back to the child blocks 950*a-d*.

In some examples the parent block 900 (for example, the verification module 903/instructor module 901) may be configured to determine which portion or component of the circuit is responsible for the circuit not meeting the technical requirements, and in the event that a child block(s) 950*a-d* can be identified, the parent block 900 may be configured to send the revised technical criteria only to the child block responsible for the offending portions or components of the circuits. However, in other examples the revised criteria may be sent back to all child blocks 950*a-d*. It will also be appreciated that in some examples the parent module 900 may determine that additional and/or alternative child blocks 950*a-d* and/or grandchild blocks may be required to design the relevant portions or components of the circuit, for example to meet the revised technical criteria.

The process then continues in an iterative manner, where the converter module 951*a-d* of each child block 950*a-d* receives these revised or adapted technical criteria from the parent block 900 and converts these into a new set of requirements for designing a portion or component of the analogue circuit to meet those adapted technical criteria. The assembly module 952*a-d* receives these new requirements and designs components/a portion of the circuit that meets these requirements. The simulator module 953*a-d* then simulates how the redesigned components/portion of the circuit would work in situ to check whether the designed components/portion of the circuit designed by the assembly module is technically feasible. The child block 950*a-d* is then configured to send the (re)designed components/portion of the circuit back to the parent 900.

Once the parent 900 receives all of the (re)designed components/portions of the circuit back from all the child blocks 950*a-d*, the parent 900 then assembles the completed circuit (in this case the ADC) from the components/portions designed by each child block and verifies whether the designed circuit meets the technical requirements via the verification and simulator module 903 which may simulate how the assembled circuit performs and compares this simulated performance to the technical requirements. If the simulated performance does not meet the technical requirements, then the process repeats whereby a revised set of criteria are sent back to the child block(s) 950*a-d*.

It will be understood that the child blocks 950*a-d* and/or the parent block 900 may also comprise a loop mitigation module to stop endless redesign loops occurring. For example, the loop mitigation module may be configured to have a record of previously designed circuits and output a loop indication if a redesigned component/portion of a circuit, or completed circuit, is identical to a previously designed component/portion of a circuit, or completed circuit, or only differs from a previously designed component/portion of a circuit, or completed circuit by less than a selected threshold level of difference. For example, the parent block 900 may comprise the loop mitigation module and may be configured to end the design process and accept the last designed circuit as the completed circuit in the event that the loop mitigation module provides the loop indication. Additionally or alternatively the parent block 900 may be configured to reduce the selected threshold level of difference, for example if the design process repeats for a selected number of iterations. This may have the effect of finding the "best compromise" functioning circuit that meets the technical requirements.

Figure 3:
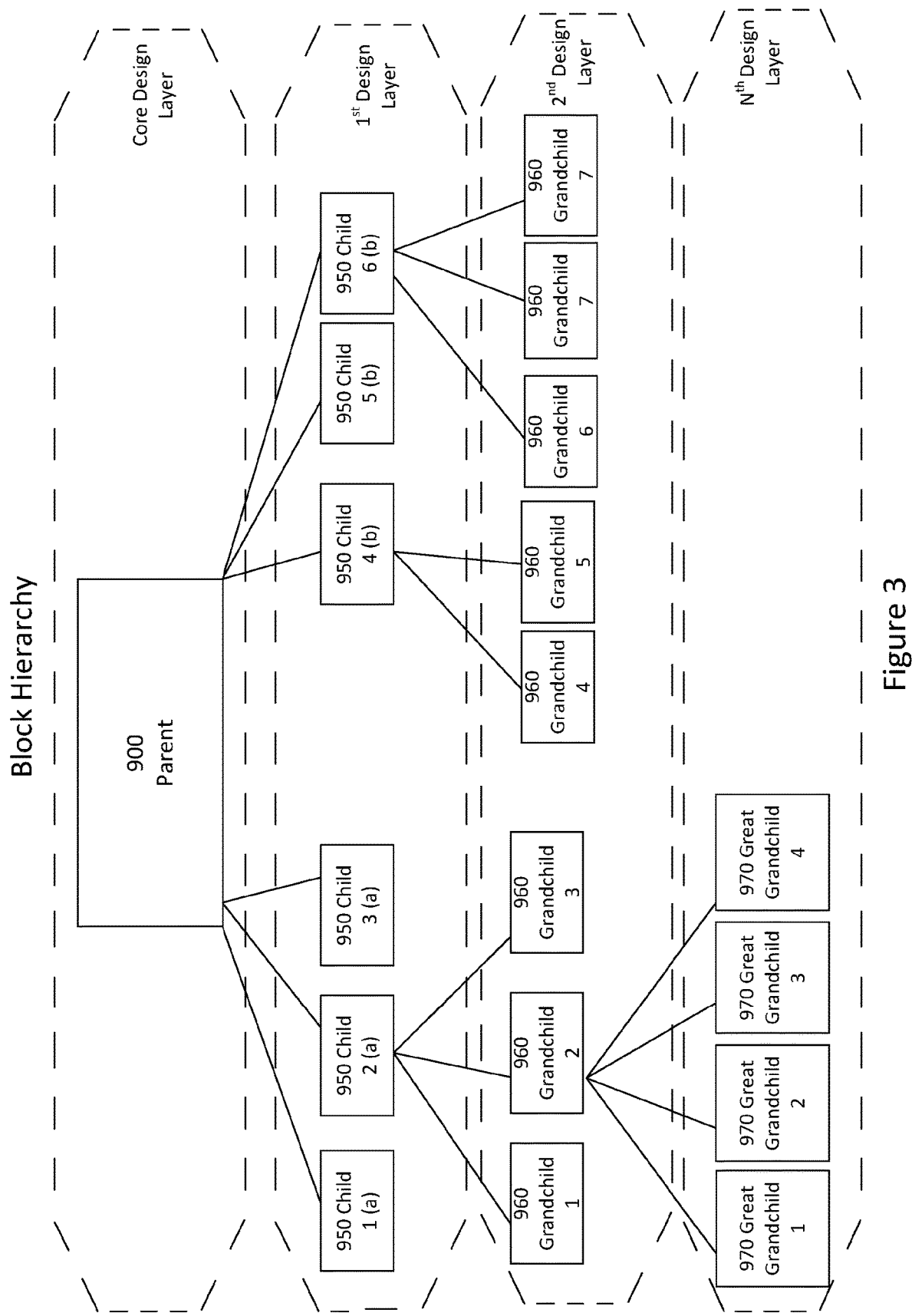
FIG. 3 shows a functional schematic view of another example implementation of a computer-implemented model for designing analogue circuit.

FIG. 3 illustrates a functional schematic view of another example implementation of a computer-implemented model for designing analogue circuits. The implementation of the model is in many respects similar to the model shown in FIG. 2 and the functionality described above for the parent 900 and child blocks 950a-d with respect to FIG. 2 may be ascribed to the parent and child blocks in FIG. 3. In addition, some of the functionality described in FIG. 2 with respect to a primary design unit or parent block 900 may be ascribed to a secondary design unit or child block 950a-d in FIG. 3 where that child block has tertiary design units or "grandchild" blocks beneath it, and so on.

In more detail, as shown in FIG. 3, the model hierarchy comprises a core design layer comprising a primary design unit or parent block. Although only one parent block 900 is shown in the core design layer in FIG. 3, it will be understood that in some examples there may be more than one parent block 900, for example where each parent block 900 operates in parallel. For example, each parent block 900 may be configured to design different aspects (e.g. functionally and/or structurally different from each other) of an analogue circuit.

Beneath the core design layer sits a first design layer. The first design layer comprises secondary design units or child blocks 950 coupled to the parent block 900 of the layer above (in this case the core design layer). In the example shown there are six child blocks, all coupled to the parent block of the core design layer. The child blocks 950 are grouped into two different groups: a first group comprising child blocks 1, 2 and 3; and a second group comprising child blocks 3, 4 and 5. Each child block 950 is coupled to the parent block 900. The two groups may represent different functional regions or areas of an analogue circuit which the parent block 900 instructs to be designed in parallel.

In the example shown, the child blocks 950 of the first group are coupled in parallel to the parent block 900 of the core design layer, and the child blocks 950 of the second group are coupled in parallel to the parent block 900 of the core design layer. The child blocks 950 may be grouped in this way to design different areas or aspects (e.g. functionally and/or structurally different from each other) of an analogue circuit. However, it will be understood that in some examples not all child blocks 950 of the first design layer need to be coupled in parallel to the parent block of the core design layer. For example, child blocks 1 and 3 of the first design layer may be coupled to the parent block 900 of the core design layer, and child block 2 of the first design layer may be coupled in series to child blocks 1 and 3 of the first design layer respectively.

The grouping of the child blocks 950 may be determined by the parent block 900 of the core design layer. For example, the parent block 900 may be configured to group the child blocks of the first design layer so as to design different aspects (e.g. functionally and/or structurally different from each other) of an analogue circuit. The parent block 900 of the core design layer may be configured to do this based on a determination of requirements from a customer specification.

Beneath the first design layer sits a second design layer. The second design layer comprises tertiary design units or grandchild blocks 1, 2, 3, 4, 5, 6, 7 and 8 960. The grandchild blocks 960 are coupled to child blocks of the layer above (the first design layer). Not every child block of the first design layer is coupled to a grandchild block of the second design layer. In the example shown, grandchild blocks 1, 2 and 3 of the second design layer are coupled in parallel to child block 2 of the first design layer. However, as described above for the child blocks 950 of the first design layer, it will be understood that in some examples not all grandchild blocks of the second design layer need to be coupled in parallel to the child block of the first design layer. For example, grandchild blocks 1 and 3 of the second design layer may be coupled to the child block 2 of the first design layer, and grandchild block 2 of the second design layer may be coupled in series to grandchild blocks 1 and 3 of the second design layer respectively.

Beneath the second design layer sits another (nth) design layer. The nth design layer comprises greatgrandchild blocks 1, 2, 3 and 4 970. The greatgrandchild blocks 970 are coupled to grandchild blocks 960 of the layer above (the second design layer) in much the same way that the grandchild blocks 960 of the second design layer are coupled to the child blocks 950 of the first design layer. It will therefore be understood that there may a plurality of further design layers sitting below the second design layer each comprising their own blocks coupled to blocks of the layer above.

The structure of the block hierarchy shown in FIG. 3 is such that the blocks of different layers of the model are configured to design aspects or portions of an analogue circuit at different levels of complexity. For example, the parent block 900 may be configured to design a complete analogue circuit, the child blocks 950 configured to design functional components of the analogue circuit (such as an op-amp, AC/DC converter, level shifters, comparators, voltage regulators, power switches etc.), and grandchild block 960 configured to design the components of that functional component (e.g. the arrangement of resistors, transistors, capacitors, diodes, inductors etc. for that component). It will however be understood that the grandchild blocks 960 could be configured to design more hierarchical blocks such as an operational amplifier or a voltage reference or a comparator, etc.

The parent block 900 (of the core design layer) may be configured to determine the level of complexity a block of a selected layer is configured to design, and/or the blocks of one layer may be configured to determine the level of complexity that the blocks of the layer below are configured to design.

Additionally or alternatively, the structure of the block hierarchy shown in FIG. 3 is such that the blocks of different layers of the model are configured to design aspects or portions of an analogue circuit based on different functional or structural requirements. For example, one layer may comprise blocks configured to design aspects or portions of an analogue circuit based on one functional requirement (e.g. size) and another layer may comprise blocks configured to design another functional requirement (e.g. current or voltage).

Figure 4:
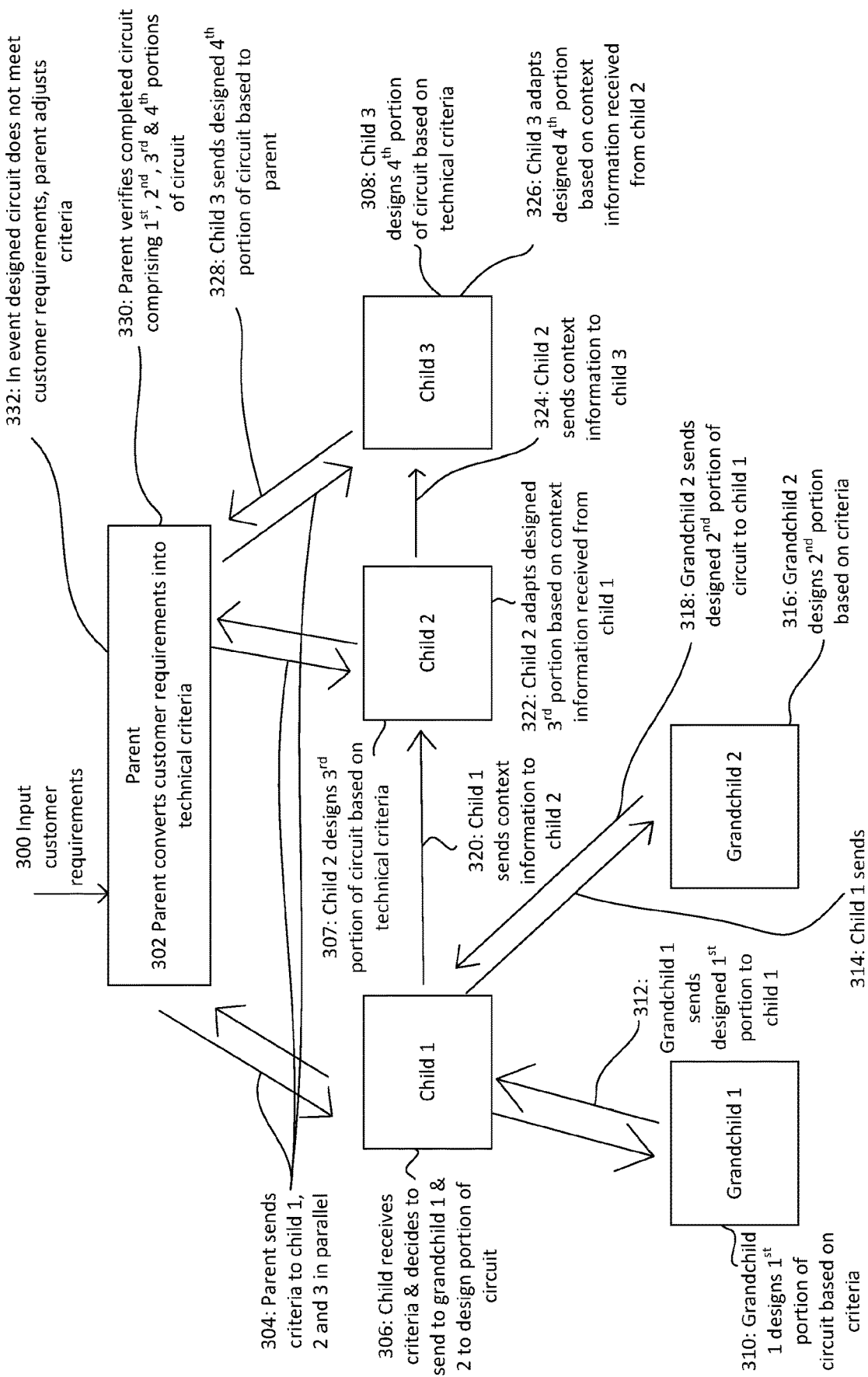
FIG. 4 shows a functional schematic flow chart for a method of designing an analogue circuit, for example using the example computer-implemented model of FIG. 2 or FIG. 3.

FIG. 4 shows a functional schematic flow chart for a method of designing an analogue circuit, for example using the example computer-implemented hierarchical model of FIG. 2 or FIG. 3.

In more detail, at step 300 the parent block 900 receives the customer requirements. The customer requirements may, for example, define the functionality of the circuit and certain limits that will be required from it—such as peak current, voltage etc. The customer requirements may also specify other features such as the PDK/foundry that the circuit will be manufactured by. The parent block 900 is configured to convert 302 the customer requirements into a set of technical criteria. The parent block 900 may additionally or alternatively be configured to determine whether to send these technical criteria to child blocks 950 in parallel, or in series, and/or whether to send different sets of criteria to child blocks 950 of a layer below.

At this stage the parent block 900 may also be configured to determine the number of layers of the model, or alternatively the block of each layer may be configured to determine if blocks of an underlying layer are required when designing portions of the circuit they are tasked with designing by a block in a layer above.

Once the parent block 900 has converted 302 the customer requirements into criteria, it then sends 304 these to the child blocks of the first layer. In the example shown, the parent block 900 sends 304 the technical criteria to child 1, child 2 and child 3 in parallel.

Upon receiving the technical criteria, in this example, child 1 determines 306 that it needs to engage blocks (grandchild blocks 960) of a layer below, and instructs grandchild 1 to design a first portion of the circuit based on the criteria. At the same time, child 2 designs 307 an initial third portion of the circuit based on the technical criteria and child 3 designs 308 an initial fourth portion of the circuit based on the technical criteria.

Grandchild 1 designs 308 the first portion of the circuit based on the technical criteria, and sends 312 this designed first portion back to child 1 which may then forward this on to the parent (optionally after having performed some simulation/verification first). Child 1 then instructs 314 grandchild 2 to design a second portion of the circuit based on the criteria. Grandchild 2 designs 316 the second portion of the circuit based on the criteria and sends 318 this back to child 1 which may then forward this on to the parent.

Once child 1 (via grandchild 1 and grandchild 2) has designed the first and second portions of the circuit, child 1 sends 320 context information to child 2. Child 2 may adapt or adjust the technical criteria received from the parent based on the context information obtained from child 1. Child 2 then adapts the initial designed third portion of the circuit based on the context information received from child 1.

In the example shown in FIG. 4, once the third portion of the circuit has been designed by child 2, the adapted third portion of the design may be sent to the parent and context information sent 324 to child 3. The context information may comprise the context created by the first, second and third portions of the circuit. Child 3 then adapts 326 the initial design of the fourth portion of the circuit based on the received context information and sends 328 the designed fourth portion to the parent block 900.

Once the parent block 900 has received all the designed portions of the circuit, the parent block 900 checks or verifies 3330 whether the designed completed circuit meets the customer requirements. As noted above, the parent block may do this by employing a verification and simulation module to simulate the performance of the completed circuit.

In the event that the designed completed circuit does not meet the customer requirements, the parent block may resend 332 adjusted criteria directly to the block responsible for designing the portion of the circuit responsible for the failure to meet requirements with additional information on what needs adjusting (and optionally by which block)—for example the criteria may be adjusted to take into account the additional information for redesigning the block to meet the customer requirements. In some examples, the parent block 900 may only send 332 only a portion of the designed circuit back to the block responsible for designing that portion—for example, as shown in FIG. 5 (as described below), the parent block 900 may send the first portion of the analogue circuit back to grandchild 1, for example with information as to what needs adjusting and/or with adjusted criteria.

It will be understood in the above example that the first, second, third and fourth portions of the analogue circuit may be independent portions of the circuit and/or be functionally dependent on each other. In other examples the first, second, third and fourth portions of the analogue circuit may be selected subsets of the analogue circuit. For example, the second portion may comprise portions of the first portion, the third portion comprises portions of the first and second portions, and the fourth portion comprise portions of the first, second and third portions.

Figure 5:
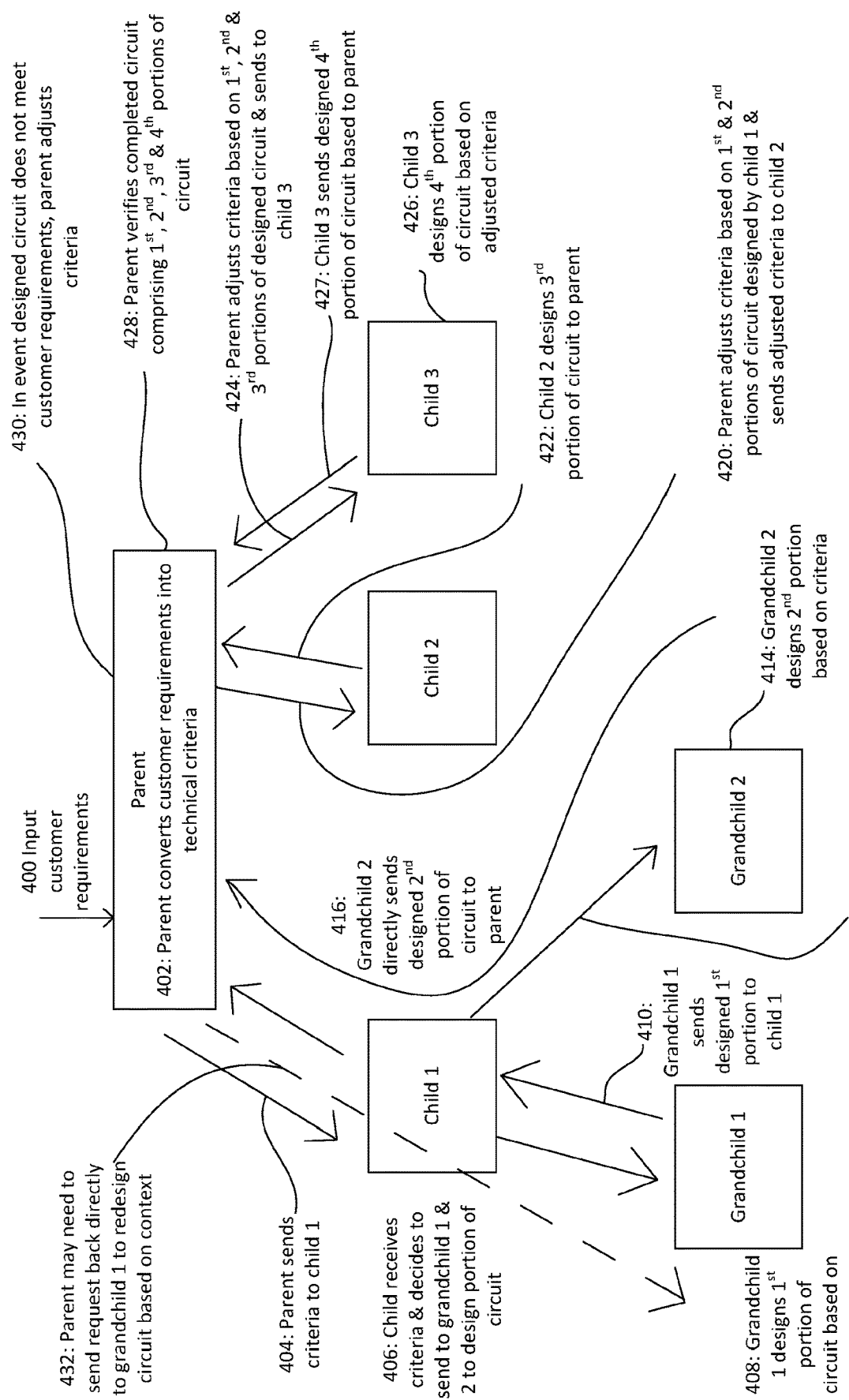
FIG. 5 shows a functional schematic flow chart for another example method of designing an analogue circuit, for example using the example computer-implemented model of FIG. 2 or FIG. 3.

FIG. 5 shows a functional schematic flow chart for a method of designing an analogue circuit, for example using the example computer-implemented hierarchical model of FIG. 2 or FIG. 3.

The method of FIG. 5 shares many features in common with the method of FIG. 4. However, of note is that rather than the child blocks 950 passing information (such as criteria and the portions or components of the circuit that they have designed) between each other, in the example shown in FIG. 5 the child blocks 950 are configured to operate in isolation in that each child block 950 is configured to report back directly to the parent block 900 and to send the designed portion or component of the analogue circuit for which it is responsible for designing directly back to the parent block 900.

This arrangement may be advantageous in that the parent block 900 may be operable to coordinate the design of all of the various portions or components of the analogue circuit in parallel. For example, in a first iteration, all child blocks 950 may be configured to design respective portions of the analogue circuit at the same time. Having received these designed portions of the analogue circuit, the parent block 900 may be configured to instruct, as a second iteration, all (or in some examples a subset of) child blocks 950 to redesign their respective portions or components based on the context provided by the designing of the first iteration. It will be appreciated that such an approach may improve the speed at which the model can design the analogue circuit.

In more detail, at step 400 the parent block 900 receives the customer requirements. As for the example described above with reference to FIG. 4, the customer requirements may, for example, define the functionality of the circuit and certain limits that will be required from it—such as peak current, voltage etc. The customer requirements may also specify other features such as the PDK/foundry that the circuit will be manufactured by. The parent block 900 is configured to convert 402 the customer requirements into a set of criteria. The parent block 900 may additionally or alternatively be configured to determine whether to send these criteria to child blocks 950 in parallel, or in series, and/or whether to send different sets of criteria to child blocks 950 of a design layer below.

At this stage the parent block 900 may also be configured to determine the number of design layers of the model, or alternatively the block of each design layer may be configured to determine if blocks of an underlying design layer are required when designing portions of the circuit they are tasked with designing by a block in a design layer above.

Once the parent block 900 has converted 402 the customer requirements into criteria, it then sends 404 these to child 1 of the first design layer. These criteria may specify how many child blocks 950 of this design layer are to be used, and which child block 950 is to be tasked with designing what portion of the analogue circuit. In the example shown in FIG. 5 the parent block 900 instructs each child block 950 in series—that is, it sends criteria to child 1 first and waits for a designed portion/component of the circuit back from child 1 before instructing child 2, and so on. However, it will be appreciated (as described above) that in other examples the parent block 900 may coordinate all child blocks 950 in parallel, such that criteria are sent to all child blocks 950 at the same time.

Upon receiving the criteria, in this example, child 1 determines 406 that it needs to engage blocks (grandchild blocks 960) of a layer below, and instructs grandchild 1 to design a first portion of the circuit based on the criteria. Grandchild 1 designs 408 the first portion of the circuit based on the criteria, and sends 410 this designed first portion back to child 1 which may then forward this on to the parent (optionally after having performed some simulation/verification first). Child 2 then instructs 412 grandchild 2 to design a second portion of the circuit based on the criteria. Grandchild 2 designs 414 the second portion of the circuit based on the criteria.

It will be understood that in various implementations of the model, blocks communicate with blocks of a layer immediately adjacent to them. However, in some examples, blocks may also be able to communicate with blocks in layers that are not immediately adjacent to them. In the example shown in FIG. 5, grandchild 2 is configured to send 416 the designed second portion of the circuit directly back to the parent 900, and the parent 900 may be configured to send criteria and context information back to grandchild 2.

Once child 1 (via grandchild 1 and grandchild 2) has designed the first and second portions of the circuit, the parent block 900 may adjust 420 the criteria based on the designed first and second portions of the circuit and send the adjusted criteria to child 2. Child 2 may then design a third portion of the circuit based on these adjusted criteria. It will be understood that adjusting the criteria in this way is one way of taking into account the context created by the first and second portions of the circuit designed by child 1/grandchildren 1 and 2—for example, as with the example described above in relation to FIG. 4, the parent block 900 may be configured to adjust the criteria based on the context provided by the designed first and second portions of the circuit. For example, in examples where the parent block 900 comprises a verification and simulator module, the verification and simulation module may simulate the performance of the designed portion or component of the circuit to obtain the context.

However, in other examples the parent block 900 may not adjust the criteria and may instead simply send the context information (such as the designed first and second portions of the circuit designed by child 1/grandchildren 1 and 2) in parallel to the criteria. The criteria may be the same criteria sent to child 1, or the criteria may be tailored by the parent bock 900 such that the criteria are configured to be specific to each child block 950 and hence each portion or component of the circuit that each corresponding child block 950 is to be instructed to design.

In the example shown in FIG. 5, once the third portion of the circuit has been designed by child 2, the parent may send 424 adjusted criteria (for example, taking into account the context created by the first, second and third portions of the circuit) to child 3. Child 3 then designs 426 a fourth portion of the circuit based on the adjusted criteria and sends 427 the designed fourth portion to the parent block 900.

Once the parent block 900 has received all the designed portions of the circuit, the parent block 900 checks or verifies 428 whether the designed completed circuit meets the customer requirements. As noted above, the parent block may do this by employing a verification and simulation module to simulate the performance of the completed circuit.

In the event that the designed completed circuit does not meet the customer requirements, the parent block may resend 432 adjusted criteria directly to the block responsible for designing the portion of the circuit responsible for the failure to meet requirements with additional information on what needs adjusting (and optionally by which block)—for example the criteria may be adjusted to take into account the additional information for redesigning the block to meet the customer requirements. In some examples, the parent block 900 may only send 432 only a portion of the designed circuit back to the block responsible for designing that portion—for example, as shown in FIG. 5, the parent block 900 may send the first portion of the analogue circuit back to grandchild 1, for example with information as to what needs adjusting and/or with adjusted criteria.

It will be understood in the above example that the first, second, third and fourth portions of the analogue circuit may be independent portions of the circuit and/or be functionally dependent on each other. In other examples the first, second, third and fourth portions of the analogue circuit may be selected subsets of the analogue circuit. For example, the second portion may comprise portions of the first portion, the third portion comprises portions of the first and second portions, and the fourth portion comprise portions of the first, second and third portions.

Figure 6:
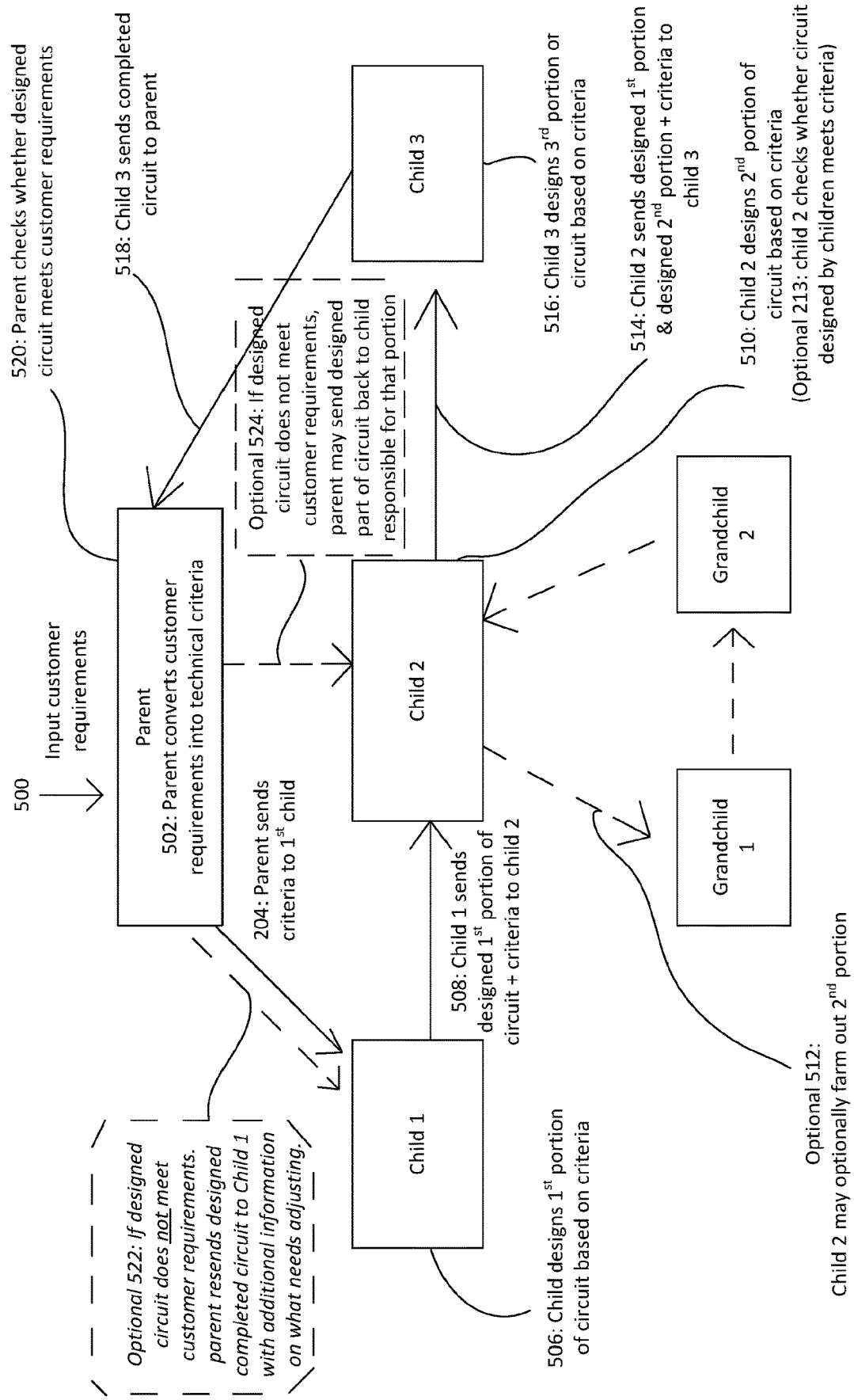
FIG. 6 shows a functional schematic flow chart for another example method of designing an analogue circuit, for example using the example computer-implemented model of FIG. 2 or FIG. 3.

FIG. 6 shows a functional schematic flow chart for a method of designing an analogue circuit, for example using the example computer-implemented hierarchical model of FIG. 2 or FIG. 3. The method of FIG. 6 shares many features in common with the methods of FIG. 4 and FIG. 5.

At step 500 the parent block 900 receives the customer requirements. As for the methods described above in relation to FIG. 4 and FIG. 5, the customer requirements may, for example, define the functionality of the circuit and certain limits that will be required from it—such as peak current, voltage etc. The customer requirements may also specify other features such as the PDK/foundry that the circuit will be manufactured by. The parent block 900 is configured to convert 5202 the customer requirements into a set of criteria. The parent block 900 may additionally or alternatively be configured to determine whether to send these criteria to child blocks 950 in parallel, or in series, and/or whether to send different sets of criteria to child blocks 950 of a layer below.

At this stage the parent block 900 may also be configured to determine the number of layers of the model, or alternatively the block of each layer may be configured to determine if blocks of an underlying layer are required when designing portions of the circuit they are tasked with designing by a block in a layer above.

Once the parent block 900 has converted 502 the customer requirements into criteria, it then sends 504 these to child 1 of the first design layer. These criteria may specify how many child blocks 950 of this layer are to be used, and which child block 950 is to be tasked with designing each portion of the analogue circuit.

Upon receiving the criteria, the child 1 designs 506 a first portion of the analogue circuit based on the received criteria. It will be understood that child 1 may be configured to design a first portion of the analogue circuit based on a subset/a first portion of the criteria applicable to it, as determined by the parent block.

Once child 1 has designed the first portion of the analogue circuit, the criteria received from the parent block 900 may dictate that child 1 is to send 508 the designed first portion of the circuit and the criteria on to a second child (child 2) of the same layer. Child 2 may design 510 a second portion of the analogue circuit based on the received criteria, and in some examples may design the second portion of the analogue circuit based on only a subset of the criteria (e.g. only those portions applicable to it) or based on all of the criteria.

Child 2 also adapts the design of the second portion of the analogue circuit based on the context created by the designed first portion of the analogue circuit designed by child 1. In some examples this context may be expressed in the form of an adjusted set of criteria—for example, child 1 and/or the parent block may be configured to adjust the criteria based on the context provided by the designed first portion of the circuit designed by child 1, although it will be understood that in other examples the context may be provided in addition to/separately to the criteria. For example, in examples where the parent block comprises a verification and simulator module, the verification and simulation module may simulate the performance of the designed portion or component of the circuit to obtain the context. Additionally or alternatively, in examples where each child block comprises a verification and simulator module, the verification and simulation module may simulate the performance of the designed portion or component of the circuit to obtain the context.

In some examples, child 2 may determine that it needs to employ blocks of a lower layer to design portions of the circuit that it is tasked with designing, and/or determine whether to employ these blocks of a lower layer in series and/or in parallel. Additionally or alternatively, the criteria received by the child 2 may dictate (for example, as determined by the parent block) that child 2 is to employ blocks of a lower layer to design portions of the circuit that child 2 is tasked with designing (and whether to employ these blocks in series or in parallel). For example, as shown in FIG. 6, child 2 may optionally instruct 512 grandchild 1 and grandchild 2 to design a subset of the second portion of the analogue circuit. In such examples, child 2 may optionally verify 513 whether the portion of the circuit designed by blocks of the layer below (in the example shown, grandchild 1 and grandchild 2) meet the criteria required of them.

Child 2 then sends 514 the designed first portion, the designed second portion and the criteria to child 3. In some examples, the criteria may be modified by a preceding child. For example, the criteria may be modified by child 1 and/or child 2 before being sent to the next child. For example, child 2 may be configured to modify the criteria it sends to child 3 based on the designed first portion of the circuit and/or the designed second portion of the circuit.

Child 3 then designs 516 a third portion of the analogue circuit based on the received criteria and additionally or alternatively the designed first portion and/or the designed second portion of the circuit.

Child 3 then sends 518 the completed circuit to the parent block, and the parent block checks 520 whether the designed completed circuit meets the customer requirements. As noted above, the parent block may do this by employing a verification and simulation module to simulate the performance of the completed circuit.

In the event that the designed completed circuit does not meet the customer requirements, the parent block may resend 522 the designed completed circuit to child 1 with additional information on what needs adjusting (and optionally by which block). Additionally or alternatively, in the event that the designed completed circuit does not meet the customer requirements, the parent block may send 524 only a portion of the designed circuit back to the block responsible for designing that portion—for example, the parent block may send the second portion of the analogue circuit back to child 2, for example with information as to what needs adjusting and/or with adjusted criteria. Child 2 may then design that portion of the circuit and either send it directly back to the parent block for checking as to whether to meets the customer requirements, or to child 3 which may then redesign the third portion of the circuit based on the redesigned second portion of the circuit (and/or optionally based on the adjusted criteria).

It will be understood in the above example that the first, second and third portions of the analogue circuit may be independent portions of the circuit and/or be functionally dependent on each other. In other examples the first, second and third portions of the analogue circuit may be selected subsets of the analogue circuit. For example, the second portion may comprise portions of the first portion, and the third portion comprise portions of the first and second portions.

Figure 7:
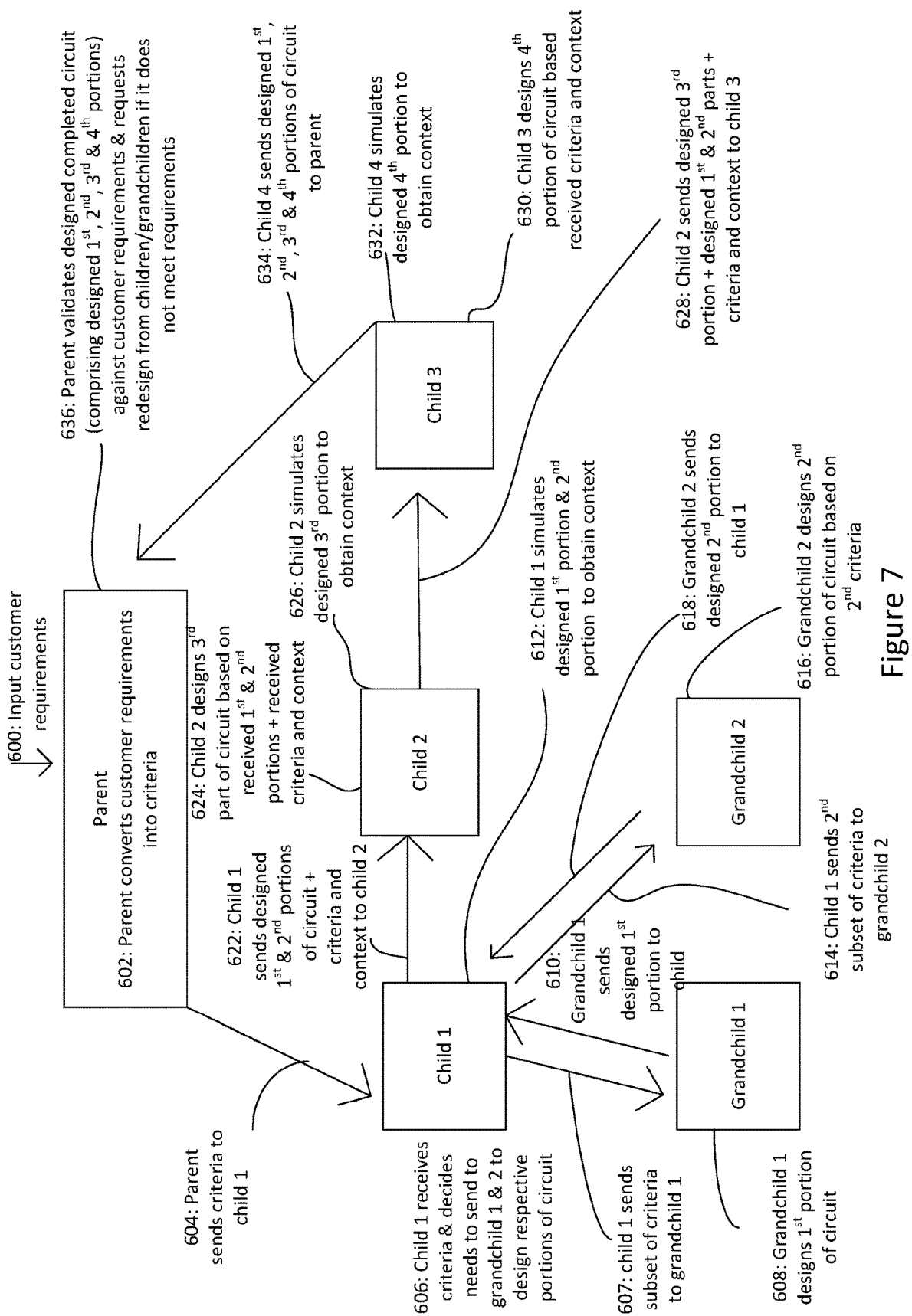
FIG. 7 shows a functional schematic flow chart for another example method of designing an analogue circuit, for example using the example computer-implemented model of FIG. 2 or FIG. 3.

FIG. 7 shows a functional schematic flow chart for another method of designing an analogue circuit, for example using the example computer-implemented hierarchical model of FIG. 2 or FIG. 3. The method of FIG. 7 shares many features in common with the methods of FIG. 6 in that information such as criteria and/or context information is shared directly between children. In addition, in the example shown in FIG. 7, the context information is provided separately to the criteria (i.e. the criteria are not adjusted based on context).

In more detail, at step 600 the parent block 900 receives the customer requirements. As for the example described above with reference to FIGS. 4, 5, 6 and 7, the customer requirements may, for example, define the functionality of the circuit and certain limits that will be required from it—such as peak current, voltage etc. The customer requirements may also specify other features such as the PDK/foundry that the circuit will be manufactured by. The parent block 900 is configured to convert 602 the customer requirements into a set of criteria. The parent block 900 may additionally or alternatively be configured to determine whether to send these criteria to child blocks 950 in parallel, or in series, and/or whether to send different sets of criteria to child blocks 950 of a layer below.

At this stage the parent block 900 may also be configured to determine the number of layers of the model, or alternatively the block of each layer may be configured to determine if blocks of an underlying layer are required when designing portions of the circuit they are tasked with designing by a block in a layer above.

Once the parent block 900 has converted 602 the customer requirements into criteria, it then sends 604 these to child 1 of the first design layer. These criteria may specify how many child blocks 950 of this layer are to be used, and which child block 950 is to be tasked with designing what portion of the analogue circuit. In the example shown in FIG. 6 the parent block 900 instructs each child block 950 in series—that is, it sends criteria to child 1 first, and then child 1 passes instructs child 2 and so on.

Upon receiving the criteria, in this example, child 1 determines 606 that it needs to engage blocks (grandchild blocks 960) of a layer below, and instructs 607 grandchild 1 to design a first portion of the circuit based on a first subset of the criteria. As part of this process child 1 may divide the criteria into subsets relevant to it and/or the grandchildren that it instructs.

Grandchild 1 designs 608 the first portion of the circuit based on the first subset of the criteria, and sends 610 this designed first portion back to child 1. Child 1 then instructs 414 grandchild 2 to design a second portion of the circuit based on a second subset the criteria. Grandchild 2 designs 616 the second portion of the circuit based on the criteria and sends the designed second portion back to child 1. Although this process is described in series (i.e. child 1 only instructs grandchild 2 once grandchild 1 has designed its portion of the circuit), it will be understood that in other examples child 1 may instruct both grandchild 1 and grandchild 2 in parallel. Additionally it will be understood that in some examples child 1 may simulate the behaviour of the first portion of the circuit designed by grandchild 1 to obtain the context provided by the portion of the circuit designed by grandchild 1, and send this context information to grandchild 1 (and optionally the other child blocks) along with the criteria.

Once child 1 (via grandchild 1 and grandchild 2) has designed the first and second portions of the circuit, child 1 may simulate 612 the behaviour of the first and second portions of the circuit to obtain their context, and send 622 the criteria and the context provided by the designed first and second portions of the circuit to child 2. Child 1 may also send the designed first and second portions along to child 2 for forwarding on to the parent block 900. Child 2 may then design 624 a third portion of the circuit based on a subset of the criteria relevant to it, and the context information provided by child 1.

In the example shown in FIG. 6, once the third portion of the circuit has been designed by child 2, child 2 may simulate 626 the behaviour of the third portion of the circuit, and sends 628 this context information to child 3 along with the criteria (as well as the designed first, second and third portions for forwarding on to the parent block 900). It will be understood that in some examples the context information relating to other portions of the circuit (if available), such as from the designed first and second portions, may also be sent to child 3. Child 3 then designs 630 a fourth portion of the circuit based on the criteria (or a subset of the criteria relevant to it), simulates 632 the behaviour of the designed fourth portion of the circuit, and sends 634 the designed fourth portion to the parent block 900 along with the other designed portions and the context information.

Once the parent block 900 has received all the designed portions of the circuit, the parent block 900 checks or verifies 636 whether the designed completed circuit meets the customer requirements. As noted above, the parent block 900 may do this by employing a verification and simulation module to simulate the performance of the completed circuit.

In the event that the designed completed circuit does not meet the customer requirements, the parent block may resend criteria back to child 1 to repeat the process, along with the context information provided by the previous iteration. The process then repeats as described above. In some examples the parent block 900 may adjust the criteria sent to the child blocks based on a difference between the designed completed circuit and the customer requirements, for example based on a simulated behaviour of the completed circuit compared to the customer requirements.

It will be understood in the above example that the first, second, third and fourth portions of the analogue circuit may be independent portions of the circuit and/or be functionally dependent on each other. In other examples the first, second, third and fourth portions of the analogue circuit may be selected subsets of the analogue circuit. For example, the second portion may comprise portions of the first portion, the third portion comprises portions of the first and second portions, and the fourth portion comprise portions of the first, second and third portions.

Figure 8A:
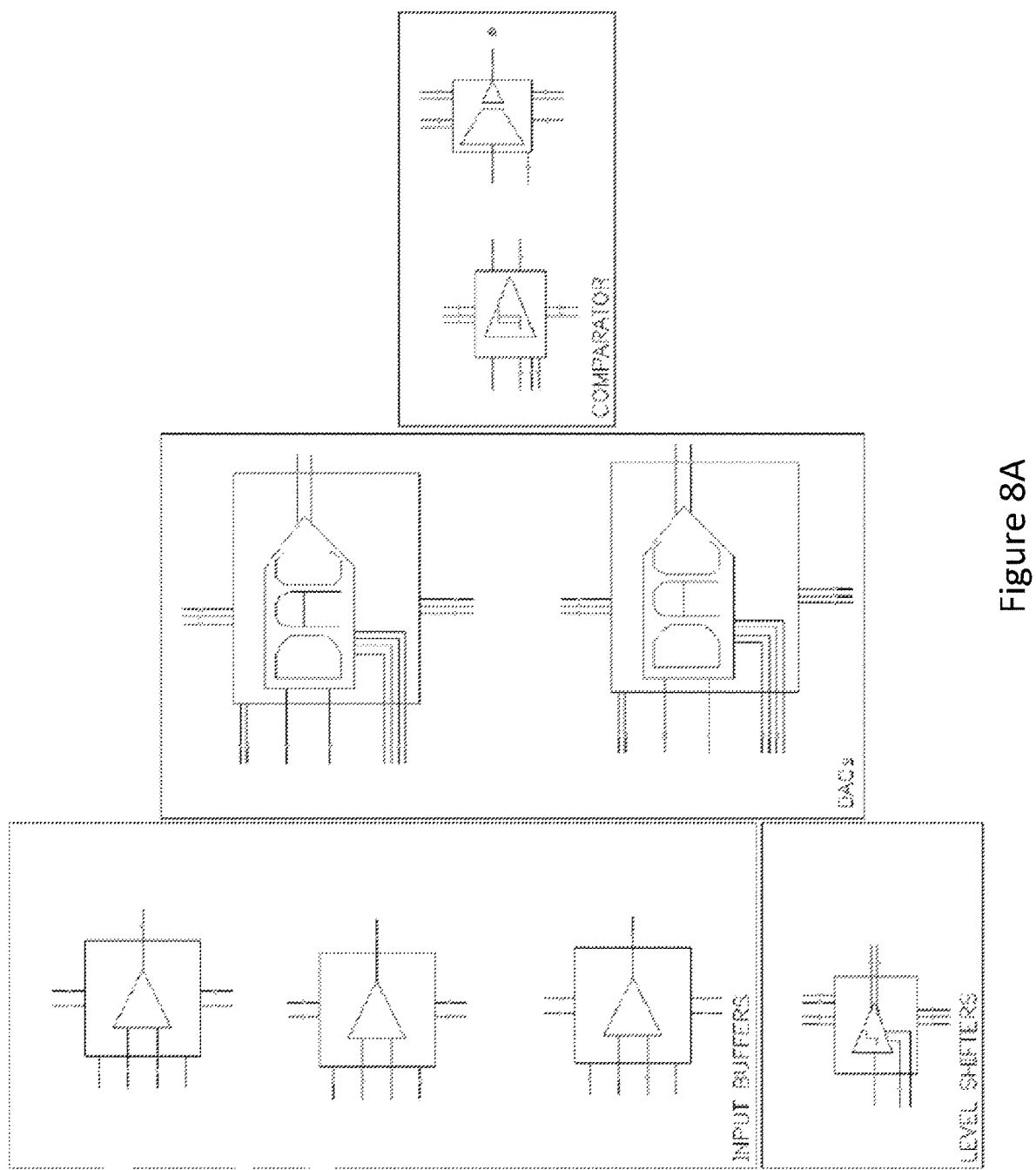
FIG. 8A shows portions of an analogue circuit designed by a computer-implemented hierarchical model, such as the model described with reference to any of FIGS. 1A to 7.

FIG. 8A shows portions of an analogue circuit designed by a computer-implemented hierarchical model, such as the model described above with reference to any of FIGS. 1A to 7, and FIG. 8B shows an example of a designed analogue circuit comprising the circuit portions of FIG. 8A, which in this case is an ADC.

FIG. 8A shows Input Buffers, Level Shifters, DACs and a Comparator. Each of these may form a portion of a completed analogue circuit, such as the completed ADC shown in FIG. 8B.

Figure 8B:
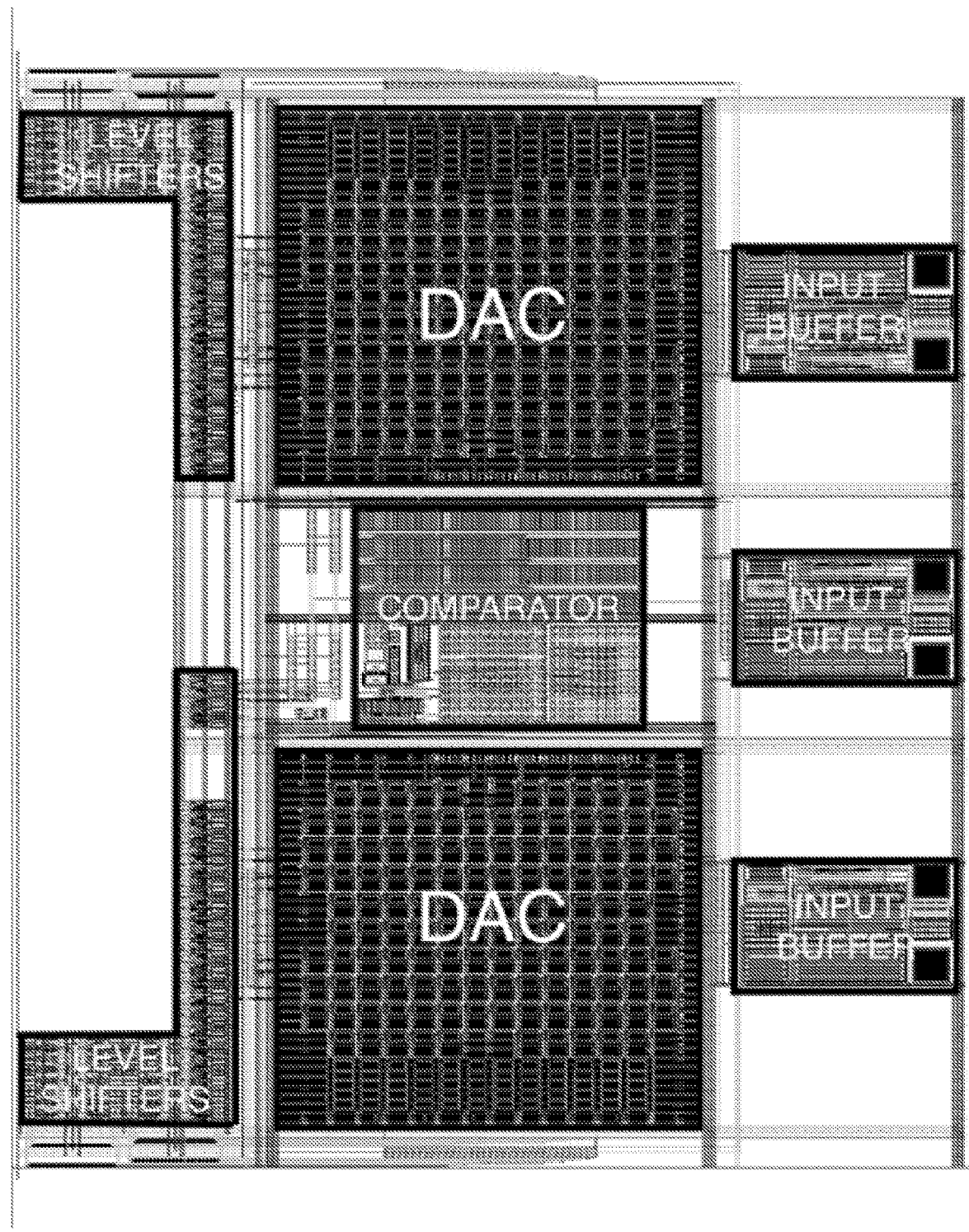
FIG. 8B shows an example of a designed analogue circuit comprising the circuit portions of FIG. 8A.

The examples shown in FIGS. 8A and 8B have been designed using a computer-implemented hierarchical model as described above. A parent block (or primary design unit) is responsible for designing the overall ADC, with child blocks (or secondary design units) being responsible, respectively, for each of the Input Buffers, Level Shifters, DACs and the Comparator. The parent block receives technical requirements from a user and converts these into technical criteria which are used by each child block to design their respective portions of the circuit. The context of other portions of the circuit is considered and used by the child blocks in designing their respective portions of the circuit. The model is also iterative in that once the parent block 900 has instructed each child block 950*a-d* to design their respective portions or components, a degree of redesign of the circuit and its portions is performed so that the context provided by the other portions of the circuit is used in designing the respective circuit portions and the circuit as a whole. As described above, each child block and/or parent block may also perform validation/verification to determine whether the designed portions/complete circuit meets the technical requirements asked of it.

In the designed circuit shown in FIG. 8B, the reason there are two DACs is that the circuit provides a differential ADC works . . . The reason there are multiple (in the example shown, three) input buffers is that two are used to buffer two inputs and the reference is also buffered as an input.

It will be understood in the context of the present disclosure that a non-exhaustive list of example analogue parameters that may form basis of the criteria include: Noise tolerance; Power Supply Rejection Ratio (PSRR); Common Mode Range—Input (Input CMR); Common Mode Range—Output (Output CMR); Linearity; Maximum Offset; Bandwidth; Minimum Slew Rate; Intrinsic Delay; Minimum phase margin; Active Power consumption; Static power consumption; IP3 point; Filter centre-frequency; Filter band-pass range; Load Step response; Line step response; Output Accuracy; Noise figure; Calibration range; Noise floor; SNR; ENOB; SINAD; Output frequency range; Jitter—ptp; Jitter—RMS; Output ripple ptp; Total Harmonic Distortion; Start-up time; Channel isolation; Reference voltage; Gain error; Offset error; Gain drift.

It will also be understood that the design units (such as the primary, secondary and tertiary design units) may be implemented in software or hardware, for example as dedicated circuitry. For example, the design units may be implemented as part of a computer system. The computer system may include a bus or other communication mechanism for communicating information data, signals, and information between various components of the computer system. The components may include an input/output (I/O) component that processes a user (i.e., sender, recipient, service provider) action, such as selecting keys from a keypad/keyboard, selecting one or more buttons or links, etc., and sends a corresponding signal to the bus. The I/O component may also include an output component, such as a display and a cursor control (such as a keyboard, keypad, mouse, etc.). A transceiver or network interface may transmit and receives signals between the computer system and other devices, such as another user device, a merchant server, or a service provider server via a network. In one embodiment, the transmission is wireless, although other transmission mediums and methods may also be suitable. A processor, which can be a micro-controller, digital signal processor (DSP), or other processing component, processes these various signals, such as for display on the computer system or transmission to other devices via a communication link. The processor may also control transmission of information, such as cookies or IP addresses, to other devices.

The components of the computer system may also include a system memory component (e.g., RAM), a static storage component (e.g., ROM), and/or a disk drive (e.g., a solid-state drive, a hard drive). The computer system performs specific operations by the processor and other components by executing one or more sequences of instructions contained in the system memory component.

Logic may be encoded in a computer readable medium, which may refer to any medium that participates in providing instructions to a processor for execution. Such a medium may take many forms, including but not limited to, non-volatile media, volatile media, and transmission media. In various implementations, non-volatile media includes optical or magnetic disks, volatile media includes dynamic memory, such as a system memory component, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by a computer system. In various other embodiments of the present disclosure, a plurality of computer systems 600 coupled by a communication link to a network (e.g., such as a LAN, WLAN, PTSN, and/or various other wired or wireless networks, including telecommunications, mobile, and cellular phone networks) may perform instruction sequences to practice the present disclosure in coordination with one another.

It will also be understood that aspects of the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

In the context of the present disclosure other examples and variations of the apparatus and methods described herein will be apparent to a person of skill in the art.

The invention claimed is:

1. An analogue circuit design apparatus, the apparatus comprising:
   a primary design unit and a plurality of secondary design units;
   wherein the primary design unit is configured to:
   a) obtain information representing technical requirements for the analogue circuit;
   b) identify, based on the received information, a plurality of circuit portions for forming the analogue circuit;
   c) determine, for each circuit portion of the plurality circuit portions, respective technical criteria for that circuit portion; and
   d) provide the respective technical criteria for each circuit portion to at least one of a plurality of secondary design units;
   each of the plurality of secondary design units of the analogue circuit design apparatus is configured to:
   e) design, a respective circuit portion of the plurality of circuit portions based on the technical criteria for that respective circuit portion provided by the primary design unit; and
   f) output a resulting design of the respective circuit portion; and
   the primary design unit is further configured to:
   g) obtain, a set of designs comprising a respective design for each circuit portion from at least one of a plurality of secondary design units;
   h) generate, at least an initial design for the analogue circuit, based on the set of designs;
   i) simulate an analogue circuit based on the generated design to produce at least one simulation output;
   j) verify whether or not the analogue circuit meets the technical requirements for the analogue circuit, and when the analogue circuit meets the technical requirements, output the generated design; and when the analogue circuit does not meet the technical requirements:

determine, for at least one affected circuit portion of the plurality circuit portions, revised technical criteria for that affected circuit portion based on the simulation output and the technical requirements;

provide, to at least one corresponding secondary design unit, the revised technical criteria for each affected circuit portion;

receive a respective updated design of each affected circuit portion from the at least one corresponding secondary design unit;

update the set of designs with the respective updated design of each affected circuit portion; and repeat steps h) to j) for the updated set of designs.

2. The analogue circuit design apparatus of claim 1, wherein each of the plurality of secondary design units of the analogue circuit design apparatus is configured to simulate the behaviour of the respective circuit portion and verify whether or not the respective circuit portion meets the technical criteria for that respective circuit portion; and when the respective circuit portion meets the technical criteria, output the designed respective portion; and when the respective circuit portion does not meet the technical criteria, adapt the design of the respective portion based on the simulated behaviour.

3. The analogue circuit design apparatus of claim 2 wherein each of the plurality of secondary design units is configured to adapt the design of the respective portion based on the simulated behaviour by adapting the design of the respective portion based on a difference between the simulated behaviour and the technical criteria.

4. The analogue circuit design apparatus of claim 2 wherein adapting the design of the respective portion based on the simulated behaviour comprises adapting the technical criteria of the corresponding respective circuit portion.

5. The analogue circuit design apparatus of claim 1 wherein each of the plurality of secondary design units of the analogue circuit design apparatus is configured to simulate the behaviour of the respective circuit portion and output the simulated behaviour as context information for use by another one of the secondary design units for designing a corresponding further respective circuit portion.

6. The analogue circuit design apparatus of claim 1, wherein, after at least an initial design of a given circuit portion has been completed by at least another one of the secondary design units, at least one of the secondary design units is configured to adapt its output initial design based on a context of its corresponding circuit portion, the context comprising technical criteria generated based on the completed design of the given circuit portion completed by the at least another one of the secondary design units.

7. The analogue circuit design apparatus of claim 6 wherein each of the secondary design units is configured to repeat the step of adapting the design of a further circuit portion in the event that the modification of the design of another circuit portion of the plurality of circuit portions causes a change of context for that further circuit portion.

8. The analogue circuit design apparatus of claim 6 wherein each of the secondary design units is configured to repeat the step of adapting the design of a further circuit portion only in the event that the change in context is greater than a selected threshold level of change in context.

9. The analogue circuit design apparatus of claim 6, wherein each of the secondary design units is configured to adapt the design of the circuit portions output from each of the plurality of secondary design units based on their respective contexts after at least an initial design of their corresponding circuit portion has been completed by each corresponding secondary design unit.

10. The analogue circuit design apparatus of claim 6, as dependent on claim 2, wherein the context of the further circuit portion is obtained by simulating the performance of the given circuit portion.

11. The analogue circuit design apparatus of claim 1 wherein each secondary design unit is configured to design a respective circuit portion of the plurality of circuit portions based on the technical criteria for that respective circuit portion provided by the primary design unit comprises performing a lookup in a database of designed circuits and/or circuit portions for circuit portions that fulfil the technical criteria.

12. The analogue circuit design apparatus of claim 1 wherein the portions of the circuit are identified based on the received information and based on the functionality provided by those portions of the circuit.

13. The analogue circuit design apparatus of claim 6, wherein each secondary design unit is configured to adapt the design of a selected portion of the circuit based on the context of that portion comprises adjusting the technical criteria for the selected portion of the circuit.

14. A method of designing an analogue circuit, the method comprising:

at a primary design unit of an analogue circuit design apparatus:

a) obtaining information representing technical requirements for the analogue circuit;

b) identifying, based on the received information, a plurality of circuit portions for forming the analogue circuit;

c) determining for each circuit portion of the plurality circuit portions respective technical criteria for that circuit portion; and d) providing the respective technical criteria for each circuit portion to at least one of a plurality of secondary design units;

at each of the plurality of secondary design units of the analogue circuit design apparatus:

e) designing, a respective circuit portion of the plurality of circuit portions based on the technical criteria for that respective circuit portion provided by the primary design unit; and f) outputting, a resulting design of the respective circuit portion; and at the primary design unit:

g) obtaining, a set of designs comprising a respective design for each circuit portion from at least one of a plurality of secondary design units;

h) generating, at least an initial design for the analogue circuit, based on the set of designs;

i) simulating an analogue circuit based on the generated design to produce at least one simulation output;

j) verifying whether or not the analogue circuit meets the technical requirements for the analogue circuit, and when the analogue circuit meets the technical requirements, outputting the generated design; and when the analogue circuit does not meet the technical requirements:

determining, for at least one affected circuit portion of the plurality circuit portions, revised technical criteria for that affected circuit portion based on the simulation output and the technical requirements;

providing, to at least one corresponding secondary design unit, the revised technical criteria for each affected circuit portion;

receiving a respective updated design of each affected circuit portion from the at least one corresponding secondary design unit;

updating the set of designs with the respective updated design of each affected circuit portion; and repeating steps h) to j) for the updated set of designs.

15. The method of claim 14 further comprising, at each of the plurality of secondary design units of the analogue circuit design apparatus, simulating the behaviour of the respective circuit portion and verifying whether or not the respective circuit portion meets the technical criteria for that respective circuit portion; and when the respective circuit portion meets the technical criteria, outputting the designed respective portion; and when the respective circuit portion does not meet the technical criteria, adapting the design of the respective portion based on the simulated behaviour.

16. The method of claim 15 wherein adapting the design of the respective portion based on the simulated behaviour comprises adapting the design of the respective portion based on a difference between the simulated behaviour and the technical criteria.

17. The method of claim 15 wherein adapting the design of the respective portion based on the simulated behaviour comprises adapting the technical criteria of the corresponding respective circuit portion.

18. The method of claim 14 further comprising, at each of the plurality of secondary design units of the analogue circuit design apparatus, simulating the behaviour of the respective circuit portion and outputting the simulated behaviour as context information for use by another one of the secondary design units for designing a corresponding further respective circuit portion.

19. The method of claim 14, wherein, after at least an initial design of a given circuit portion has been completed by at least another one of the secondary design units, at least one of the secondary design units is configured to adapt its output initial design based on a context of its corresponding circuit portion, the context comprising technical criteria generated based on the completed design of the given circuit portion completed by the at least another one of the secondary design units.

20. A computer readable non-transitory storage medium comprising a program for a computer configured to cause a processor to perform the method of claim 14.

* * * * *